United States Patent [19]

Ouchi

[11] Patent Number: 4,841,141
[45] Date of Patent: Jun. 20, 1989

[54] OPTICAL COORDINATES INPUTTING APPARATUS HAVING SWITCHING MEANS TO OPERATE Y-AXIS LIGHT EMITTERS WHEN OPERATION OF THE X-AXIS EMITTERS OUTPUTS A COORDINATES SIGNAL

[75] Inventor: Junichi Ouchi, Furukawa, Japan

[73] Assignee: Alps Electric Co., Ltd., Japan

[21] Appl. No.: 206,455

[22] Filed: Jun. 13, 1988

[30] Foreign Application Priority Data

Sep. 7, 1987 [JP] Japan .................. 62-223769

[51] Int. Cl.$^4$ .................. G01V 9/04; G06M 7/00; H01J 40/14
[52] U.S. Cl. .................. 250/221; 250/222.1
[58] Field of Search .................. 250/221, 222.1; 340/555, 556

[56] References Cited

U.S. PATENT DOCUMENTS

| | | | |
|---|---|---|---|
| 4,645,920 | 2/1987 | Carroll et al. | 250/222.1 |
| 4,672,195 | 6/1987 | Golborne et al. | 250/221 |
| 4,749,853 | 6/1988 | Salim | 250/221 |
| 4,801,797 | 1/1989 | Ohouchi et al. | 250/221 |

Primary Examiner—David C. Nelms
Assistant Examiner—William L. Den
Attorney, Agent, or Firm—Guy W. Shoup; Paul J. Winters

[57] ABSTRACT

An optical coordinates inputting apparatus which has a light emitting element array and a photodetector array opposed to the light emitting element array, arranged in X- an Y-axis directions, X-axis and Y-axis multiplexer means sequentially driven as a pair of light emitting element and photodetector of the X- and Y-axis directions, X- and Y-axis signal detecting means for outputting a coordinates signal when a light signal outputted from the driven light emitting element is not photodetected by the opposed photodetector, and switching means for operating either the X-axis or Y-axis multiplexer means, whereby, when the coordinates signal is outputted, the switching means operates the other X- or Y-axis multiplexer means. Thus, the inputting apparatus drives to scan either one of a light emitting element array and a photodetector array in X- or Y-axis direction during a period that coordinates are not inputted to reduce its power consumption.

2 Claims, 2 Drawing Sheets

OPTICAL COORDINATES INPUTTING APPARATUS HAVING SWITCHING MEANS TO OPERATE Y-AXIS LIGHT EMITTERS WHEN OPERATION OF THE X-AXIS EMITTERS OUTPUTS A COORDINATES SIGNAL

BACKGROUND OF THE INVENTION

1. Field of the Invention

This invention relates to an optical coordinates inputting apparatus adapted to reduce power consumption during a period that the operation of inputting coordinates is not executed.

2. Description of the Prior Art

An optical coordinates inputting apparatus is disposed on the front face of an image display unit, such as a CRT display or an LCD, etc. for use in inputting coordinates to a microcomputer or the like. The inputting apparatus is constructed to arrange a light emitting element array and a photodetector array opposed to the light emitting element array in X- and Y-axis directions on the outer periphery of the front surface of a screen, such as a CRT display, to sequentially selectively drive to scan the light emitting elements and the photodetectors by multiplexer means, and to output a coordinates signal of a position where a light signal outputted from the light emitting element is interrupted by a finger of inputting the coordinates when the light signal outputted from the light emitting element is interrupted by the finger by the driving scan so that the opposed photodetector cannot photodetect the light signal to produce a coordinates input by the calculation of the microcomputer.

The surface on which the light emitting element array and the photodetector array are arranged is disposed in coincidence with a Z-axis direction in the X- and Y-axis directions, or disposed to be displaced in a Z-axis direction as disclosed in Japanese Patent Laid-open No. 139606/1982. The light emitting element array and the photodetector array of the X- and Y-axis directions are so constructed as to simultaneously drive to be scanned in both the X- and Y-axis directions by multiplexer means or to drive to be first scanned in either one of the X- and Y-axis directions and subsequently scanned in the other direction after the first driving scan is finished.

In the conventional optical coordinates inputting apparatus as described above, the light emitting element array and the photodetector array of the X- and Y-axis directions are driven to be scanned simultaneously in both the X- and Y-axis directions or alternately.

In order to produce an X-axis coordinates signal and a Y-axis coordinates signal, the light emitting element array and the photodetector array of the X- and Y-axis directions are driven to be scanned when the coordinates are inputted. In order to further reduce the power consumption of the apparatus, it is desirable to eliminate the driving scan of the light emitting element array and the photodetector array as much as possible during a period that the coordinates are not inputted. In addition, when the light emitting element array and the photodetector array are not driven to be scanned during the period that the coordinates are not inputted, the operating frequencies of the light emitting element array and the photodetector array decrease to thus increase the lives of the arrays.

SUMMARY OF THE INVENTION

Accordingly, an object of this invention is to provide an optical coordinates inputting apparatus which can eliminate the above-mentioned drawbacks and drives to scan either one of a light emitting element array and a photodetector array in X- or Y-axis direction during a period that coordinates are not inputted to reduce its power consumption.

In order to achieve the above and other objects of the invention, there is provided according to the present invention an optical coordinates inputting apparatus comprising a light emitting element array and a photodetector array opposed to the light emitting element array, arranged in X- and Y-axis directions, X-axis and Y-axis multiplexer means sequentially driven as a pair of light emitting element and photodetector of the X- and Y-axis directions, X- and Y-axis signal detecting means for outputting a coordinates signal when a light signal outputted from the driven light emitting element is not photodetected by the opposed photodetector, and switching means for operating either the X-axis or Y-axis multiplexer means, whereby, when the coordinates signal is outputted, the switching means operates the other X- or Y-axis multiplexer means.

In the optical coordinates inputting apparatus constructed as above, either the X- or Y-axis multiplexer is operated by the switching means to drive to scan either X- or Y-axis light emitting element array and photodetector array. When a coordinates signal is not outputted by the driving scan, the other multiplexer means is not operated, and the other light emitting element array and photodetector array are not driven to be scanned. When the coordinates signal is outputted by the driving scan, the switching means operates the other multiplexer means to drive to scan the other light emitting element array and photodetector array, and the other coordinates signal is outputted.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Figure 1:
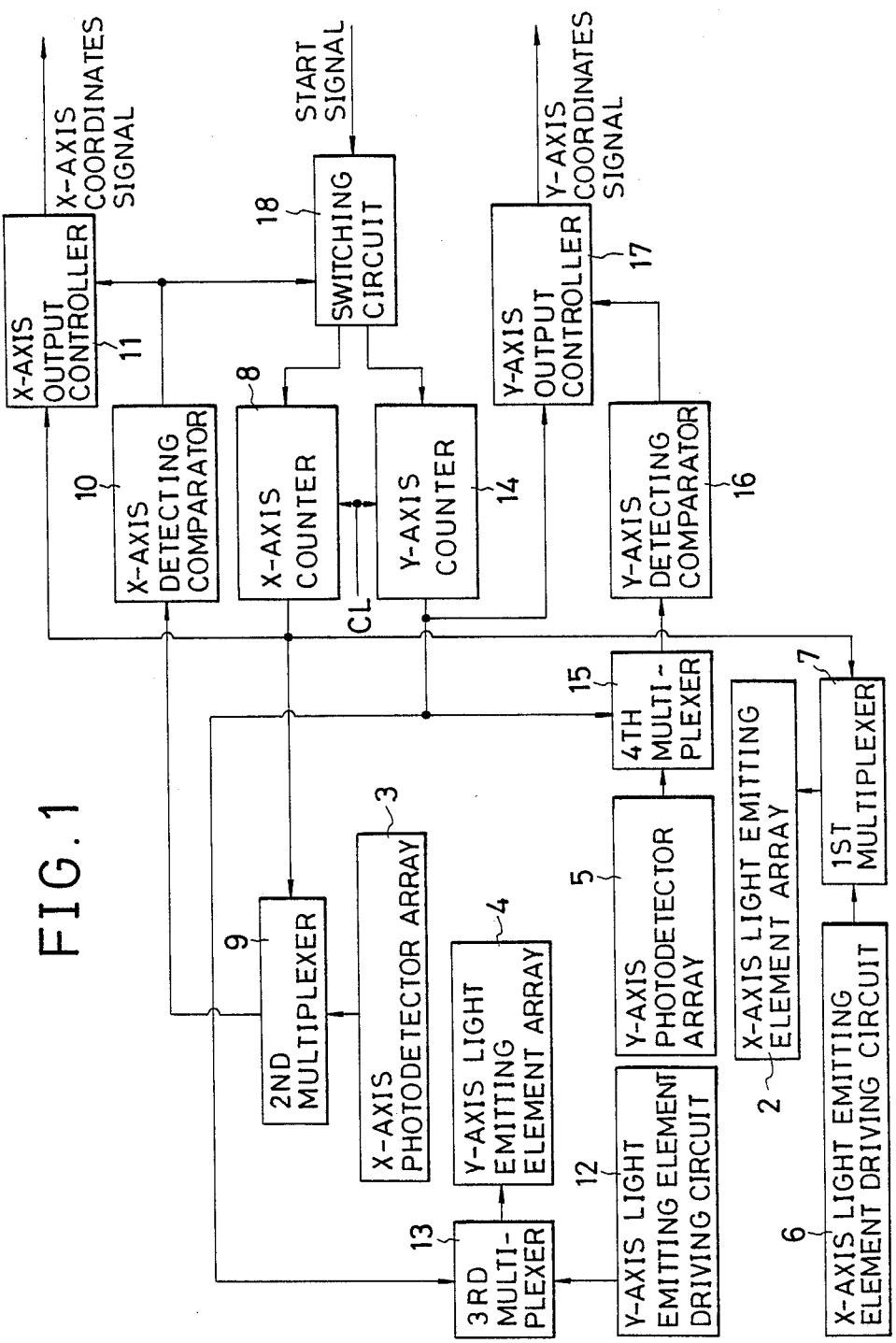
FIG. 1 is a block diagram showing an embodiment of an optical coordinates inputting apparatus according to the present invention.

An embodiment of the present invention will be described in detail with reference to FIGS. 1 and 2. FIG. 1 is a block diagram of an embodiment of an optical coordinates inputting apparatus of the invention, and FIG. 2 is a perspective view of the embodiment of the optical coordinates inputting apparatus of FIG. 1.

Figure 2:
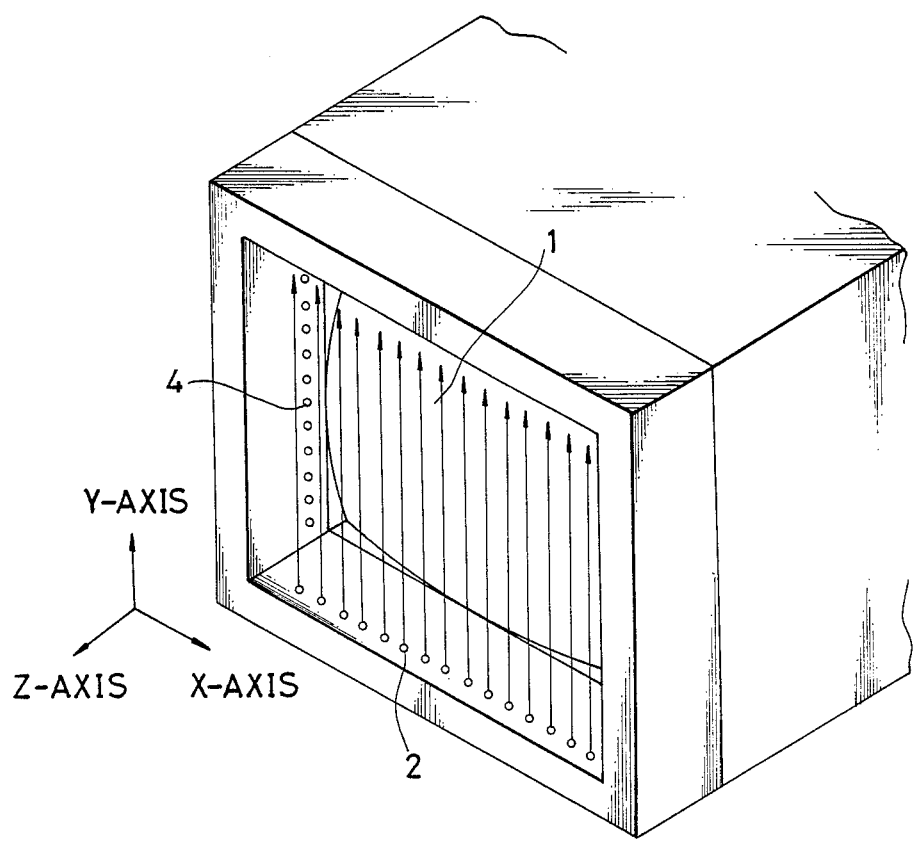
FIG. 2 is a perspective view of an external appearance of the embodiment of the optical coordinates inputting apparatus of FIG. 1.

In FIGS. 1 and 2, X-axis light emitting element array 2 and X-axis photodetector array 3 opposed to the light emitting element array 2 are arranged at the upper and lower sides of the outer periphery of the front surface of the screen of a CRT display 1 in an X-axis direction, and Y-axis light emitting element array 4 and Y-axis photodetector array 5 opposed to the light emitting element array 4 are arranged at the upper and lower sides f the outer periphery in a Y-axis direction. Further, the surface on which the X-axis light emitting element array 2 and the X-axis photodetector array 3 are arranged is displaced, for example, approx. 5 mm beforehand from the surface on which the Y-axis light emitting element array 4 and the Y-axis photodetector array 5 are arranged toward the screen of the CRT display 1 in a Z-axis direction to be arranged.

A light emitting element driving signal outputted from an X-axis light emitting element driving circuit 6 is applied to a first multiplexer, the driving signal is sequentially applied to the light emitting element of the X-axis light emitting element array 2 by the first multiplexer 7 according to an X-axis counted value outputted from an X-axis counter 8 to drive to scan it. Then, the photodetector of the X-axis photodetector array 3 opposed to the light emitting element to which the driving signal is applied and which outputs a light signal is sequentially selected by a second multiplexer 9 according to a Y-axis counted value outputted from the X-axis counter 8. The output of the photodetector of the X-axis photodetector array 3, selected by the second multiplexer 9 is applied to an X-axis detecting comparator 10. Further, the X-axis detection signal of the X-axis detecting comparator 10 and the X-axis counted value from the X-axis counter 8 are applied to an X-axis output controller 11, which outputs an X-axis coordinates signal responsive to the X-axis counted value to a microcomputer (not shown).

Similarly, a light emitting element driving signal outputted from a Y-axis light emitting element driving circuit 12 is applied to a third multiplexer 13, the driving signal is sequentially applied to the light emitting element of the Y-axis light emitting element array 4 by the third multiplexer 13 according to a Y-axis counted value outputted from a Y-axis counter 14 to drive to scan it. Then, the photodetector of the Y-axis photodetector array 5 opposed to the light emitting element to which the driving signal is applied and which outputs a light signal is sequentially selected by a fourth multiplexer 15 according to a Y-axis counted value outputted from the Y-axis counter 14. The output signal of the photodetector of the Y-axis photodetector array 5, selected by the fourth multiplexer 15 is applied to a Y-axis detecting comparator 16. Further, the Y-axis detection signal of the X-axis detecting comparator 16 and the Y-axis counted value from the Y-axis counter 8 are applied to a Y-axis output controller 17, which outputs a Y-axis coordinates signal responsive to the Y-axis counted value to the microcomputer.

Further, a switching circuit 18 of switching means, when periodically receiving a start signal from the microcomputer, first operates only the X-axis counter 8, and, when receiving the X-axis detection signal from the X-axis detecting comparator 10, operates the Y-axis counter 14. Here, a clock signal is suitably applied to the X-axis and Y-axis counters 8 and 14. When the Y-axis counter 14 is operated, the X-axis counter 8 may be continuously operated or finished.

In the embodiment described above, X-axis multiplexer means is formed of the X-axis light emitting element driving circuit 6, the first and second multiplexers 7, 9 and the X-axis counter 8, X-axis signal detecting means is formed of the X-axis detecting comparator 10 and the X-axis output controller 11, Y-axis multiplexer means if formed of the Y-axis light emitting element driving circuit 12, the third and fourth multiplexers 13, 15 and the Y-axis counter 14, and Y-axis signal detecting means is formed of the Y-axis detecting comparator 16 and the Y-axis output controller 17.

In the embodiment constructed as described above, when the start signal is applied from the microcomputer to the switching circuit 18, the X-axis counter 8 is first operated, and the X-axis light emitting element array 2 and the photodetector array 3 are driven to be scanned. Then, when the coordinates are not inputted during this driving scan and the X-axis detection signal is not outputted from the X-axis detecting comparator 10 without interrupting the light signal, the operation of the optical coordinates inputting apparatus of the invention is finished by the end of the X-axis driving scan. When the coordinates are not inputted in this manner, the X-axis light emitting element array 2 and photodetector array 3 are once driven to be scanned whenever the start signal is applied thereto.

When the coordinates are inputted to interrupt the light signal while the X-axis light emitting element array 2 and photodetector array 3 are being driven to be scanned, the X-axis detection signal is outputted from the X-axis detecting comparator 10, the X-axis output controller 11 stores the X-axis counted value when the light signal is interrupted, and outputs it as an X-axis coordinates signal to the microcomputer. Further, the switching circuit 18 operates the Y-axis counter 14 by the X-axis detection signal to drive to scan the Y-axis light emitting element array 4 and photodetector array 5. Then, the Y-axis detection signal is outputted from the Y-axis detecting comparator 16 in response to the position of the coordinates input, and the Y-axis output controller 11 outputs the Y-axis coordinates signal to the microcomputer. When the coordinates are inputted in this manner, the X-axis light emitting array 2 and photodetector array 3 are driven to be scanned, and the Y-axis light emitting element array 4 and photodetector array 5 are driven to be scanned, and the optical coordinates inputting apparatus of the invention is thus finished.

In the embodiment described above, the surface on which the X-axis light emitting element array 2 and photodetector array 3 are arranged is displaced beforehand from the surface on which the Y-axis light emitting element array 4 and photodetector array 5 are arranged in the Z-axis direction to be arranged. Thus, a small insect does not interrupt both the X-axis and Y-axis light signals during one driving scan, thereby avoiding an erroneous input due to the insect.

In the embodiment described above, the X-axis light emitting element array 2 and photodetector array 3 are driven to be scanned first by selecting them by the switching circuit 18. However, the Y-axis light emitting element array 4 and photodetector array 5 may be first driven to be scanned. Further, the X- and Y-axis light emitting element arrays 2, 4, and photodetector arrays 3, 5 may be arranged in the same surface coincident with the Z-axis direction.

According to the optical coordinates inputting apparatus of the present invention as described above, when the coordinates are not inputted, either the X- or axis light emitting element array or photodetector array is driven to be scanned by the start signal, but the other light emitting element array and photodetector array are not driven to be scanned. Thus, the power consumption can be reduced in the mount in which the other light emitting element array and photodetector array are not driven to be scanned. A period that the light signal is actually interrupted by the operator's finger is very short even while the operator inputs the coordinates in response to the display of the screen of the CRT display, the power consumption can be largely reduced to be entirely advantageous.

What is claimed is:

1. An optical coordinates inputting apparatus comprising a light emitting element array and a photodetector array opposed to the light emitting element array, arranged in X- and Y-axis directions, X-axis and Y-axis multiplexer means sequentially driven as a pair of light emitting element and photodetector of the X- and Y-axis directions, X- and Y-axis signal detecting means for outputting a coordinates signal when a light signal outputted from the driven light emitting element is not photodetected by the opposed photodetector, and switching means for operating either the X-axis or Y-axis multiplexer means, whereby, when the coordinates signal is outputted, the switching means operates the other X- or Y-axis multiplexer means.

2. An optical coordinates inputting apparatus according to claim 1, wherein the surface on which said light emitting element array and photodetector array are arranged is displaced in a Z-axis direction to be arranged in X- and Y-axis directions, and one X- or Y-axis multiplexer means for sequentially driving the light emitting element array and photodetector array arranged beforehand in the Z-axis direction is operated initially by said switching means.

* * * * *